July 12, 1927.

A. G. SLOAN

FLY HOOK

Filed March 27, 1926

1,635,644

Inventor
A. G. Sloan
By Watson E. Coleman,
Attorney

Patented July 12, 1927.

1,635,644

UNITED STATES PATENT OFFICE.

AMBROSE G. SLOAN, OF FORT SMITH, ARKANSAS.

FLY HOOK.

Application filed March 27, 1926. Serial No. 97,926.

This invention relates to fly hooks and the general object of the invention is to so form the shank of the hook that the hair, feathers or other like material bound upon the shank of the hook shall be held firmly in place so that the fly hook will last many times longer than where the hair, feathers or the like are tied to a plain or straight hook shank.

My invention is illustrated in the accompanying drawings wherein:—

Figure 1:
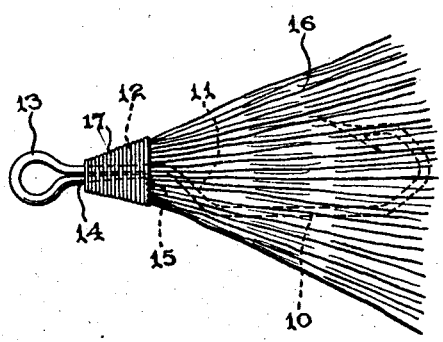
Figure 1 is a perspective view of a fishing fly hook constructed in accordance with my invention.
Figure 2:
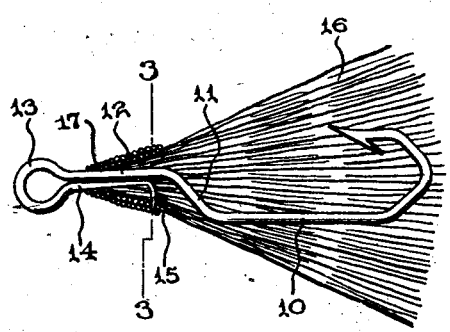
Fig. 2 is a longitudinal sectional view through the covering of the hook, the hook being in elevation.
Figure 3:
Fig. 3 is a section on the line 3—3 of Figure 2.

Referring to these drawings it will be seen that the hook 10 is formed at its inner end with the inwardly and rearwardly bent portion 11 and then with the straight shank 12 which is disposed along the medial axis of the hook, this shank 12 being then curved around so as to form an eye 13 and the extremity of the material forming the eye being then extended parallel to the shank 12 as at 14. This portion 14 is preferably tapered toward its extremity and is preferably flattened upon its inner face as is the shank 12 so that each of these portions is semi-circular in cross section and the flat faces will confront each other. Preferably the extremity of the portion 14 is turned away from the shank 12 to form a barb 15.

With this construction it will be seen that when the hair or other fly material designated 16, is tied to the hook, the wrapping 17 will extend around the shank 12 and the portion 14 and over the barb 15 so that the barb 15 will hold the hair feathers or other like fly material firmly and prevent it from being pulled off whereas the ordinary "bucktail" fly is very liable to go to pieces within a few hours of constant use.

It is to be particularly noted that the shank of the hook and the shank of the barb are both semi-circular in cross section so that the two surfaces will fit snugly, thus making the hook small in diameter where the hair or feathers are tied on. This reduces the total diameter of the shank of the hook so that the fly will not appear clumsy. The barb is tapered to a fine needle point so that it will not spread the hair or feathers when the hair is tied around it. The hook bent as I have illustrated secures a central pull so that the hook will be twice as strong as ordinary hooks and it puts the barb of the hook in the center of the "bucktail."

I have found in actual practice that a fly hook constructed in accordance with my invention will last through a number of seasons without coming apart or being injured in any way by detachment of the fly material.

Of course, I do not wish to be limited to the particular character of the hook nor the particular character of the fly material, nor the form of the "fly" as these may be varied in many ways without departing from the spirit of the invention as defined in the appended claim.

I claim:—

A fly hook having a straight shank semi-circular in cross section and bent at its rear end to form an eye, the material of the eye then extending parallel to the shank and being semi-circular in cross section to fit snugly against the same and being laterally bent at its end to form a barb, the barb being thin and tapering to a fine point, the hook being offset from the shank in the direction of said barb so as to bring the bill of the hook approximately in line with the shank, fly material disposed around the shank, and a wrapping extending around the fly material and the shank over each face of the barb and held from longitudinal movement by said barb.

In testimony whereof I hereunto affix my signature.

AMBROSE G. SLOAN.